United States Patent [19]

Pallan

[11] 4,170,902
[45] Oct. 16, 1979

[54] PIPELINE INSPECTION VEHICLES

[75] Inventor: William Pallan, Newcastle upon Tyne, England

[73] Assignee: British Gas Corporation, London, England

[21] Appl. No.: 907,349

[22] Filed: May 18, 1978

[51] Int. Cl.² .............................................. F16L 55/00
[52] U.S. Cl. ................................ 73/432 R; 73/40.5 R
[58] Field of Search ................ 73/49.5, 40.5 R, 432 R

[56] References Cited

U.S. PATENT DOCUMENTS

| 2,975,637 | 3/1961 | Burdick | 73/40.5 R X |
| 3,000,205 | 9/1961 | Suderow | 73/40.5 R X |
| 3,196,686 | 7/1965 | Cole | 73/40.5 R X |
| 3,495,546 | 2/1970 | Brown et al. | 73/432 R X |
| 3,786,684 | 1/1974 | Wiers et al. | 73/432 R |

FOREIGN PATENT DOCUMENTS 2222946 11/1972 Fed. Rep. of Germany ....... 73/40.5 R
2607412 9/1976 Fed. Rep. of Germany ....... 73/40.5 R Primary Examiner—Charles A. Ruehl
Assistant Examiner—Joseph W. Roskos
Attorney, Agent, or Firm—Watson, Cole, Grindle & Watson

[57] ABSTRACT

A pipeline inspection vehicle for inspecting the internal wall of a pipeline wherein the vehicle is provided with a speed control system energized by hydraulic and turbine power obtained from pumps driven by wheels which are in engagement with the pipeline wall.

8 Claims, 4 Drawing Figures

PIPELINE INSPECTION VEHICLES

BACKGROUND OF THE INVENTION

This invention relates to pipeline inspection vehicles.

A common way of inspecting internal surfaces of pipes is to use a pipeline inspection vehicle, known hereinafter as a PIV. The PIV is a body that is provided with the necessary instrumentation for inspection of the pipeline periodically for the purpose of detecting leaks or fractures, or detecting flaws or pits which may later result in leaks, in the metal wall of the pipe. The PIV is usually driven by gas flow reacting with resilient cups that are mounted around the body of the PIV and are in close relation to the pipes internal wall. The driving force is provided by a differential pressure acting across the resilient cups and this can lead to high velocity of the PIV. Usually the PIVs are free running, therefore the velocity is uncontrollable and varies with changes of pressure within, and inclination of, the pipe.

SUMMARY OF THE INVENTION

It is an object of the invention to provide a PIV having a self-contained means of speed control.

The present invention accordingly provides a vehicle for traversing a fluid-carrying pipeline comprising a vehicle body, a plurality of wheels mounted on the body for engagement with the wall of the pipeline, at least one hydraulic displacement device drivingly coupled to a respective wheel and connected in a hydraulic circuit, and means controlling flow in the hydraulic circuit thereby to control the speed of the vehicle.

The, or each hydraulic displacement device may be a hydraulic motor supplied with hydraulic fluid by a pump on the vehicle. The pump is preferably driven by a turbine extracting power from flow of fluid in the pipeline past the vehicle.

Alternatively, the or each displacement device may be a hydraulic pump driven by the wheels to pump hydraulic fluid through a ballast valve to a reservoir. Preferably, the hydraulic circuit includes a motor providing power for auxiliary equipment.

In either case, the vehicle preferably includes means, such as a variable-diameter ring, providing a controllable-area restricting for fluid flow in the pipeline. Preferably one closed-loop system responsive to turbine speed controls said restricting to give coarse control of vehicle speed, and another closed-loop system responsive to vehicle speed controls hydraulic fluid flow to give fine control of vehicle speed.

The control of hydraulic fluid flow may be provided by a variable-flow control, or by variably dividing the flow between a ballast valve and a motor.

DESCRIPTION OF THE DRAWINGS

Embodiments of the present invention will now be described by way of example, with reference to the drawings, in which.

DETAILED DESCRIPTION OF THE PREFERRED EMBODIMENTS

Figure 1:
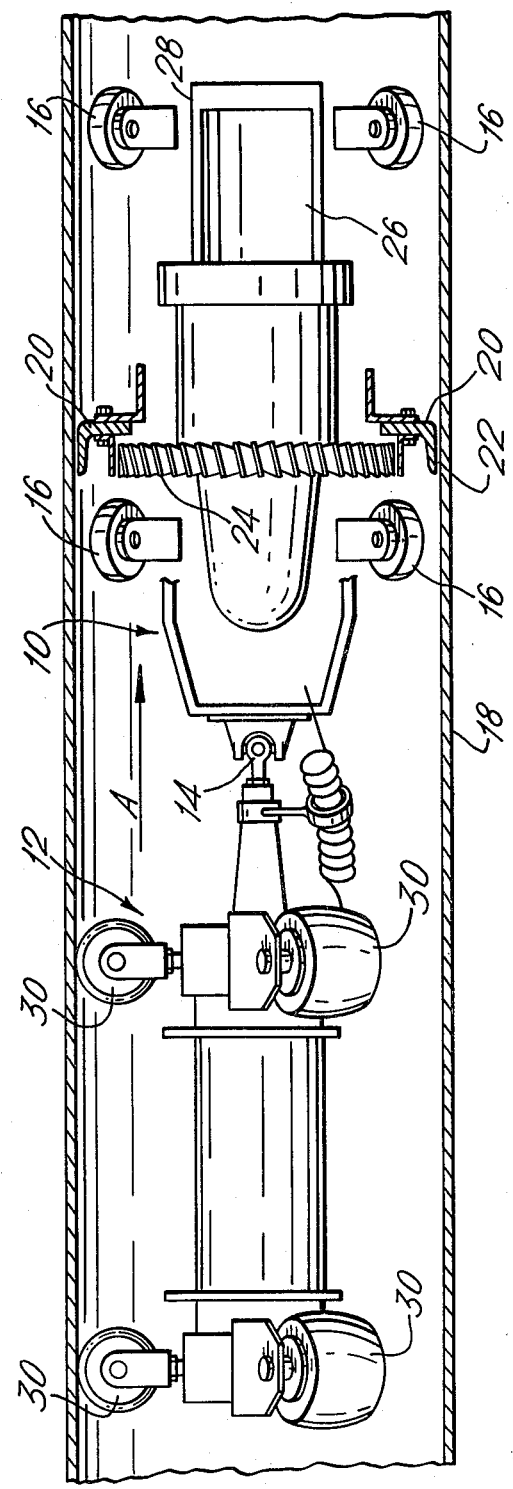
FIG. 1 is a somewhat diagrammatic side elevation of a vehicle according to the invention in a pipeline, the pipeline and a part of the vehicle being shown in section.

Referring now to FIG. 1, a gas pipeline inspection vehicle or pig comprises a fore part 10 and an after part 12 articulated by a universal joint 14. The fore part 10 is mounted on wheels 16 arranged in two sets of four and biased into engagement with the wall 18 of a pipeline by any suitable means (not shown). Ring segments 20 are mounted on the fore part 10 and are radially adjustable by means (not shown) such as hydraulic rams to form an annulus 22 of controlled dimension between the pig and the pipeline wall 18. A turbine 24 is mounted within the ring segments 20, and is coupled to drive a hydraulic pump 26 and an electric generator 28.

Gas flow in the pipeline, indicated by the arrow A, is thus divided to pass partially through the annulus 22 and partially through the turbine 24, the proportions being controllable by controlling the size of the annulus. Thus, the smaller the annulus 22 is, the higher differential pressure exists either side of the annulus, hence the vehicle will travel faster.

Figure 2:
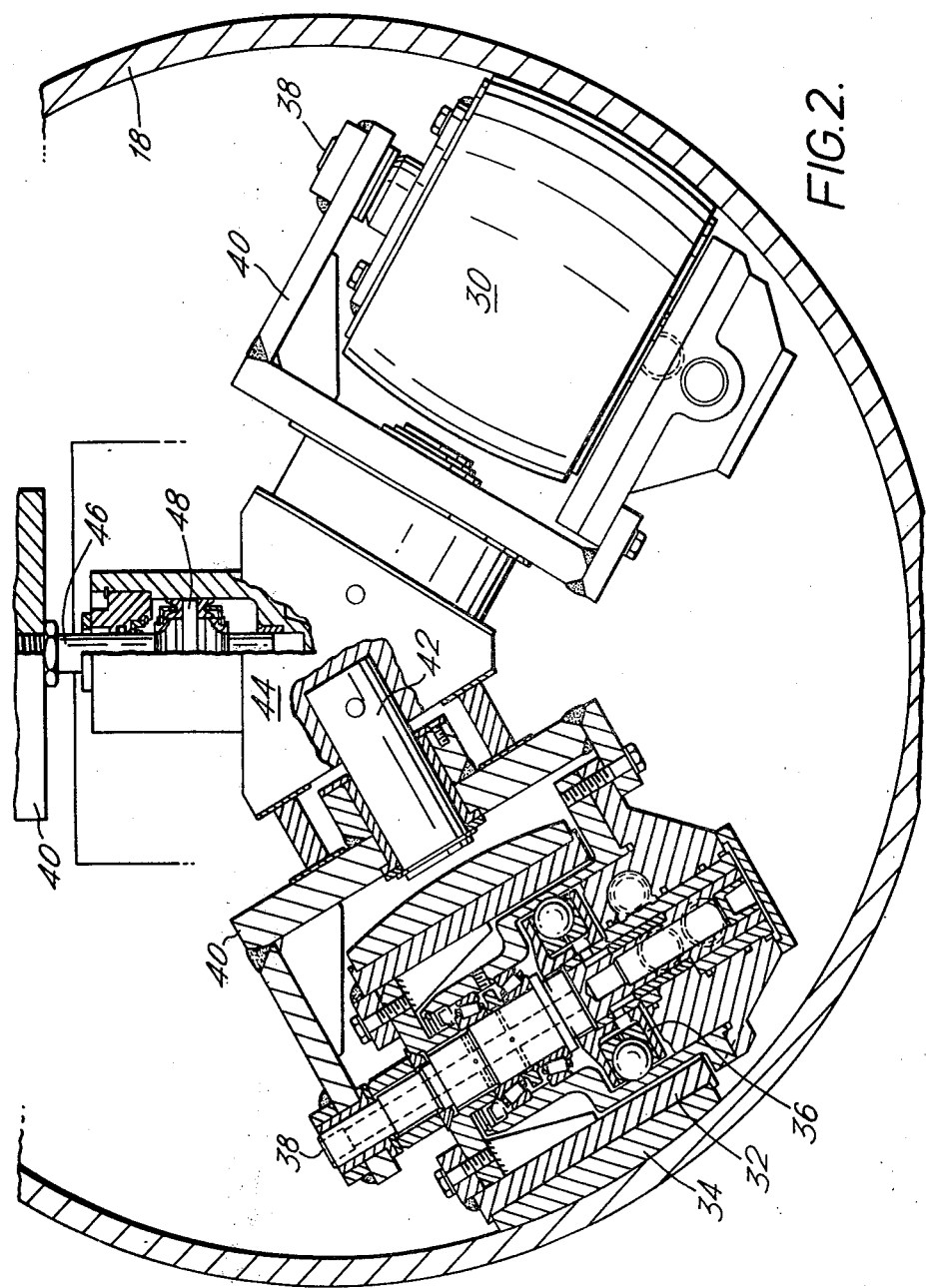
FIG. 2 is an end elevation partly in cross-section to an enlarged scale of part of FIG. 1.

The aft part 12 of the pig, which may carry testing and inspection equipment, engages the wall 18 by two sets of three driving wheels 30. One such set is seen in greater detail in FIG. 2. Each wheel 30 has a cylindrical body 32 mounting a resilient tire 34 and enclosing a hydraulic motor 36 of known construction, preferably a hydrostatic ball motor. The wheel 30 is mounted on a shaft 38 carried in a trunnion 40. In the case of two of the wheels in each set, the respective trunnion 40 is carried by a stub axle 42 secured in a central body 44, while for the third wheel, the trunnion is carried on a piston rod 46 of a hydraulic cylinder 48 on the central body 44. By maintaining a preselected pressure of hydraulic fluid within the cylinder 48, the respective wheel 30 is thrust against the pipeline wall 18, and the other wheels 30 driven into engagement by reaction.

Figure 3:
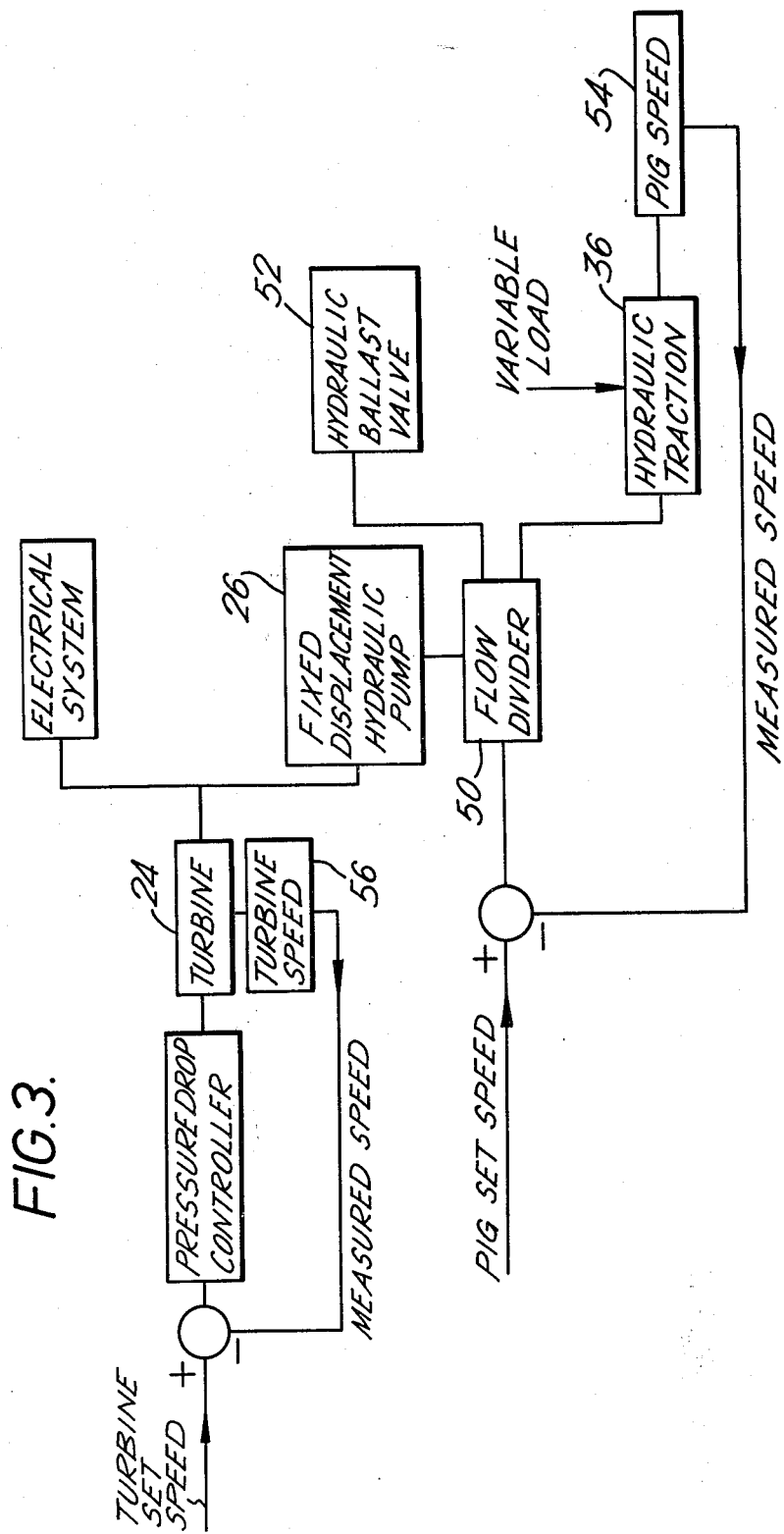
FIG. 3 is a block diagram of the control system of the vehicle of FIGS. 1 and 2.

Turning to FIG. 3, it will be seen that the pump 26 which is a fixed displacement pump, supplies the motors 36 via a controllable flow divider 50, excess fluid being diverted to a ballast valve 52. The flow divider 50 forms part of a first closed-loop system and is responsive to the difference between a preset desired speed and the actual speed of the pig as detected by a speed transducer 54 coupled to a motor 36.

A second closed-loop system acts to control the pressure drop across the vehicle by controlling the size of the annulus 22. This system comprises a turbine speed transducer 56 whose output is compared with a preset turbine speed and the resulting difference signal used to vary the annulus size.

Suitable forms of transducers, comparators and actuators are well known, and these are therefore not described or shown in detail.

In use, the pressure drop control loop is suitable used as a coarse speed control, with the hydraulic drive system providing fine control.

Figure 4:
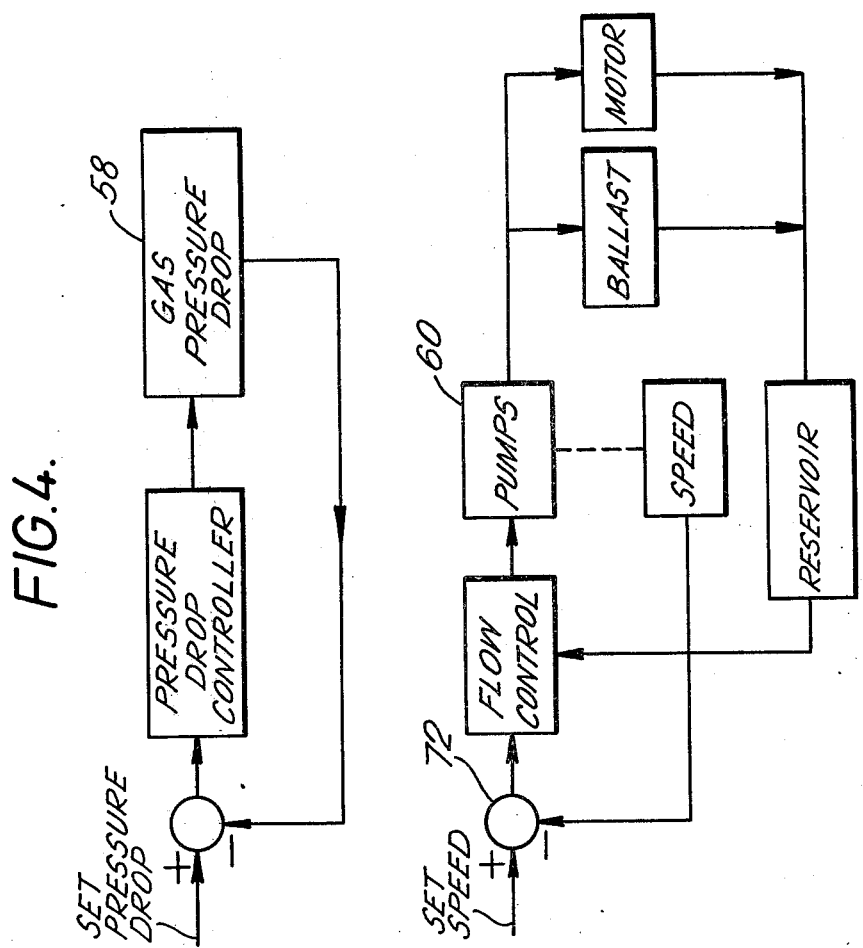
FIG. 4 is a block diagram of the control system of an alternative embodiment.

FIG. 4 illustrates another embodiment. Coarse speed control of the vehicle is provided, as above, by controlling the pressure drop across a variable-area restriction. A feed-back signal is derived from pressure transducers 58 measuring the pressure drop across the gas by-pass. The vehicle is mounted on wheels located against the pipe wall and revolve as the vehicle moves. This turning movement which drives hydraulic pumps 60 in a hydraulic circuit including a ballast valve 62 in parallel with a hydraulic motor 64, a reservoir 66, and a variable-flow control 68. The motor 64 may drive an electric generator for powering instruments. A speed transducer 70 driven by a wheel provides feedback of actual pig speed which is compared at 72 with a preset desired speed and the difference signal used to actuate the flow control 68.

The hydraulic system thus provides fine control of speed by exerting a controlled braking force on the wheels. It will be appreciated that the mechanical layout may be similar to that of the first embodiment and need not be described in detail.

Modifications of the described embodiments within the scope of the invention will be apparent. For example, only one (or some) of the wheels need be coupled with a hydraulic device. It is also possible to dispense with control of the pressure drop across the vehicle and to rely entirely on the hydraulic circuit for speed control.

I claim:

1. A pipeline vehicle for traversing a fluid-carrying pipeline comprising a vehicle body, a plurality of wheels mounted on the body for engagement with the wall of the pipeline, at least one hydraulic displacement device drivingly coupled to a respective wheel and connected in a hydraulic circuit, and means controlling flow in the hydraulic circuit thereby to control the speed of the vehicle, wherein each hydraulic displacement device is a hydraulic motor supplied with hydraulic fluid by a pump on the vehicle and wherein the pump is driven by a turbine which extracts power from the fluid in the pipeline flowing past the vehicle.

2. A vehicle according to claim 1, wherein each hydraulic displacement device is a hydraulic pump which absorbs energy from the wheel to pump hydraulic fluid through a ballast valve to a reservoir.

3. A vehicle according to claim 1, wherein the hydraulic circuit includes a motor which provides power for auxiliary equipment.

4. A vehicle according to claim 1, includes means for providing a controllable-area restriction for fluid flow in the pipeline.

5. A vehicle according to claim 4, wherein the controllable-area restriction means consists of a variable-diameter ring.

6. A vehicle according to claim 4, wherein one closed-loop system responsive to the turbine speed controls said restriction means to give coarse control of vehicle speed, and a second closed-loop system responsive to vehicle speed controls hydraulic fluid flow to give fine control of vehicle speed.

7. A vehicle to claim 6, wherein said control of hydraulic fluid flow is provided by variable-flow control.

8. A vehicle according to claim 6, wherein said control of hydraulic fluid flow is varied by variably dividing the flow between a ballast valve and a motor.

* * * * *